June 14, 1938. P. T. FARNSWORTH Re. 20,759

ELECTRON MULTIPLIER

Original Filed March 3, 1930

INVENTOR,
PHILO T. FARNSWORTH.
BY Donald K. Lippincott
ATTORNEY.

Reissued June 14, 1938

Re. 20,759

UNITED STATES PATENT OFFICE 20,759

ELECTRON MULTIPLIER

Philo T. Farnsworth, San Francisco, Calif., assignor to Farnsworth Television Incorporated, San Francisco, Calif., a corporation of California Original No. 1,969,399, dated August 7, 1934, Serial No. 432,602, March 3, 1930. Application for reissue May 18, 1936, Serial No. 80,469

26 Claims. (Cl. 250—27.5)

My invention relates to electronic discharge apparatus, and its broad purpose is to provide a means of increasing the intensity of an electron stream.

Among the objects of my invention are: First, to provide a device for multiplying the electrons available in an electron discharge device, thereby increasing the available current and decreasing the effective impedance; second, to provide an electron multiplying means which is substantially linear in its characteristics, and therefore capable of substantially distortionless amplification; third, to provide an electron multiplying device which is applicable to various types of apparatus, such as photo-electric tubes, electronic relays, amplifiers, and the like; fourth, to provide an electron multiplier which is capable of producing practically unlimited amplification; fifth, to provide an electron multiplier which may be used as an amplifier which does not introduce interference noises; and sixth, to provide a new type of electronic amplification.

My invention possesses numerous other objects and features of advantage, some of which, with the foregoing, will be set forth in the following description of my invention. It is to be understood that I do not limit myself to this disclosure of species of my invention, as I may adopt variant embodiments thereof within the scope of the claims.

In general terms, the electron multiplier in my invention comprises a pair of opposed surfaces which are adapted to liberate electrons by secondary emission. Means are provided for causing a potential drop along these surfaces, so that a graduated electrostatic field is formed between them. The electron stream which is to be multiplied is directed so as to be intercepted by one of these surfaces, thereby causing a secondary emission of electrons. These secondary electrons are accelerated by the graduated field between the surfaces, causing impacts, first with one surface and then with the other, each impact causing the release of a plurality of electrons resulting in a cumulative electron flow. The final electronic flow is proportional to the intensity of the original electron stream, the voltage of the graduated field, and the length of the path in which the repeated impacts and their resultant secondary emissions occur.

Referring to the drawing.

Figure 1:
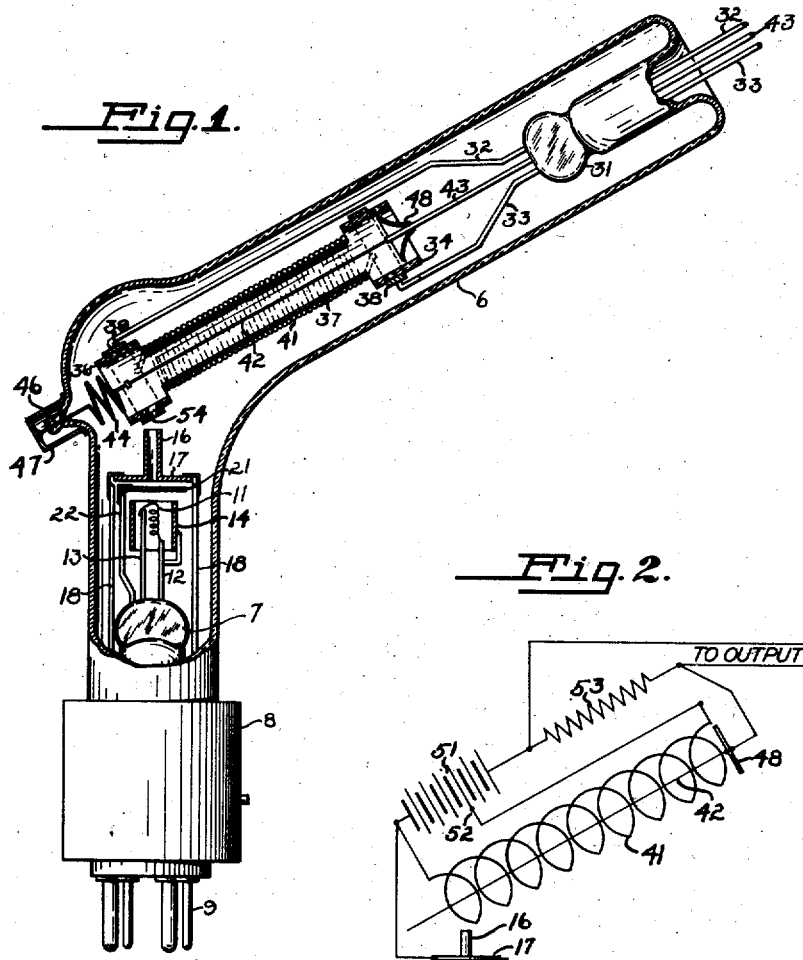
Figure 1 is a view, partly in elevation and partly in axial section, of an electron discharge device embodying a form of my invention.

In detail, the apparatus shown in the drawing comprises an evacuated envelope 6, which in this case is in the form of a cylindrical glass tube which is bent at an obtuse angle. The lower end of the tube is sealed to a stem or press 7 of conventional type which supports the apparatus for producing a modulated electron stream. This end of the tube is secured for convenience to a radio tube base 8 of the ordinary form, the leads which are sealed to the stem being connected to the pins 9 in the usual manner.

Within the tube, a filament 11 is supported by the wires 12 and 13 which are sealed through the stem 7, and the filament is surrounded by a cylindrical shield 14 which is connected to the support 12, and serves to concentrate the electron flow from the filament.

Figure 2:
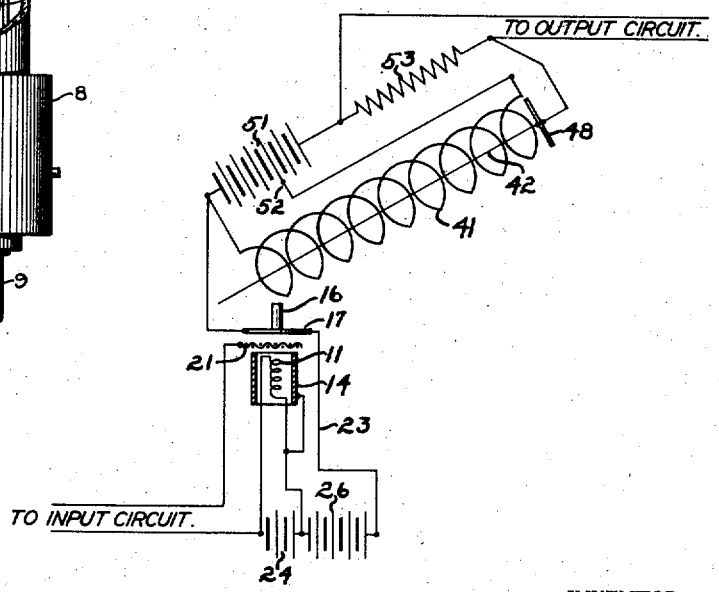
Figure 2 is a schematic diagram of the device of Figure 1, showing the principal circuits associated therewith.

An anode comprising a tubular portion 16 and a circular flange 17 is mounted upon the support 18 co-axially with the shield. As is shown by Figure 2, a strong positive potential is imposed upon the anode, and hence the electrons liberated by the filament are accelerated and a definite proportion of them is projected outwardly through the tube 16. The stream of electrons thus produced is modulated by a control electrode 21 comprising a gauze screen carried by a support 22 and interposed between the anode and the shield 14.

It will be understood that in the structure shown a signal to be amplified is impressed between filament 11 and grid 21 from an input circuit in accordance with the ordinary amplifier practice, and that this signal modulates the electron flow to the anode and hence the flow escaping through the tubular portion 16 in like proportion. The device differs from the ordinary amplifier in that the output circuit is not connected between the anode and filament, which are joined through battery 26 by a lead 23. The usual filament battery 24 and anode battery 26, are provided.

The apparatus thus far described is merely one method of producing a modulated electron stream, and is not the essential part of this invention. It may be thought of as an electron gun, and its place may be taken by a photoelectric tube, or other type of apparatus producing an electronic discharge which it is desired to multiply.

The electron multiplier proper is carried by a stem 31 which is sealed into the upper end of the envelope 6. Extending through the stem are two supporting lead wires 32 and 33, between which a hollow resistor is connected. In the present instance, this resistor comprises a glass form having annular end portions 34 and 36 joined by a pair of opposite connecting bars 37. This form may be made by cutting away opposite segments from the central portion of a glass tube.

The form is supported by a conducting ring 38, connected to the lead 33, and another conducting ring 39, connected and supported by the lead 32. Between the rings 38 and 39 a coil 41 is wound upon the form. This coil is greatly exaggerated in the drawing, being wound of extremely fine wire having as high resistance as it is practical to secure. In the device pictured, using fine filament wire wound five hundred turns to the inch, a resistance of approximately 50,000 ohms was obtained with a resistor approximately three inches long. These figures are illustrative merely, optimum performance being obtained with maximum resistance.

A filamentary electrode 42 extends axially of the resistor and connects with a lead 43 sealed through the press 30. The electrode is tensioned by a spring 44, which connects through the seal 46 to a terminal 47. The electrode 42 is preferably coated with a metal adapted to liberate electrons by secondary emission, such as thorium or barium.

After the device is evacuated, and before it is put into active operation, a current is passed through the filament between the terminals 47 and 43, raising it to incandescence and vaporizing the material from its surface, which is deposited as a coating upon the inner surface of the resistor. I have found that a very active coating is formed in this manner. For example, using thorium as a secondary emitter, I have obtained one secondary electron for each 45 volts of impact potential of a primary electron, and using barium, I have obtained one secondary electron for each 33 volts of impact potential of the primary electron.

Egress of electrons from the upper end of the resistor is practically blocked by means of a small shield 48, secured to the lead 43.

Referring again to Figure 2, a potential is applied across the resistor 41 by means of a battery 51. The resistor connects to a tap 52 on this battery, while the electrode 42 connects through a resistor 53 to the positive terminal of the battery.

As is shown by Figure 1, an aperture 54, in line with the tubular anode, permits the electron stream to enter the hollow resistor and strike within it upon the surface which has been sensitized for secondary emission. The stream strikes with a velocity obtained by falling through a potential of preferably several hundred volts, and each of the primary electrons, therefore, liberates a number of secondaries.

These secondaries are emitted with small random velocity, and are subjected to the action of an electro-static field resulting first, from the potential between the resistor 41 and the filamentary electrode 42, and second, from the fall of potential along the resistor itself. The result of the combined action of these two fields is to accelerate the secondary electron transversely of the resistor. Although the electrode 42 has a relatively small superficial area, electrons accelerated toward it would tend to be intercepted thereby except for the fact that there is an inherent longitudinal magnetic field existing in the device due to the current from battery 51 passing through the turns of the resistor 41. The longitudinal field produced causes electrons accelerated toward the electrode 42 to be deflected, and their path is such that the probability of electrons actually being intercepted by electrode 42 is greatly reduced. After passing electrode 42 they proceed at decreasing speed across the interior of the resistor and hit the opposite surface with a velocity which is substantially that due to the potential, longitudinal of the resistor, through which they have fallen.

Here their impact again causes a release of secondary electrons in increased numbers, and the action is repeated, with an increase in the intensity of the electron cloud at each impact or "reflection". When the electron stream has passed the entire length of the resistor 41, the electrons collect upon the shield 48. Thence they return to the battery 51 through the resistor 53, causing a potential drop therein which may be utilized in any desired type of output circuit connected across the resistor.

The amount of electron multiplication obtained with this device is a function of the potential through which the electrons fall between impacts, and of the number of impacts. Up to the point where space charge effect supervenes, the electron flow is directly proportional to the number of electrons entering the multiplier, which therefore has linear characteristics.

The use of the magnetic field operating in conjunction with the accelerating field raises the efficiency of the device by greatly reducing the probability of collection by the accelerating electrode.

Although I have found it desirable to deposit the secondary emitting surface upon the resistor wires themselves, this is by no means essential. The resistor may be wound upon the exterior of a glass tube, and the secondary emitter deposited upon the interior surface of this tube. In the present instance, although the major secondary emission takes place from the resistor 41, a certain amount of the action occurs from the surfaces of the bars 37 of the form upon which the resistor is wound.

Even the use of a wound resistor may be dispensed with, and a resistor sputtered on the exterior of the form may be used in conjunction with the interior emitting surface. It is even possible to make this emitting surface itself the resistor, but since the best secondary emitter appears to be a mono-molecular layer of the emitting material, and since it is extremely difficult to make such a layer having no discontinuities, I prefer to use the device of the type shown.

If, however, no inductance is used, collection by filamentary conductor 42 will be increased.

The shape of the hollow resistor is also of minor importance. The principal desideratum is that there be opposing surfaces against which the repeated impacts may take place, so that the electrons may follow a zig-zag course through the multiplier, with a release of a plurality of new electrons and consequent amplification at each successive impact.

The filamentary electrode 42 exercises a dual function: First, that of depositing the secondary emitting surface within the multiplier, and second, increasing the transverse velocity of the electrons. The latter effect increases the number of impacts occurring through the multiplier; without the electrode 42 a much smaller number of reflections would occur with a multiplier of given diameter, or a much smaller diameter would be necessary to give the same amplification. The filamentary electrode, therefore, permits a greater diameter of multiplier and consequently increases the resistance it is possible to get on a multiplier of given length.

It should be noted that whereas the ordinary audion amplifier causes distortion if it be operated at "saturation current", my electron multiplier should always be operated in this manner unless it is to cause distortion. If the potential used drops to a point permitting a space charge to establish itself in the output end of the tube, the potential along the tube is effectively reduced. This decreases the number of electrons flowing in the external circuit due to the impact of a single primary, and hence destroys the linearity of the device.

I claim:

1. An electron discharge device comprising, means for producing a modulated electron stream, a pair of opposed surfaces adapted to liberate electrons by secondary emission, and means for producing a potential gradient longitudinally of said surfaces, one of said surfaces being positioned to intercept said electron stream.

2. An electron discharge device comprising, means for producing a modulated electron stream, a pair of opposed surfaces adapted to liberate electrons by secondary emission, an electrode extending intermediate said surfaces for establishing an electrostatic field therebetween, and means for producing a potential gradient longitudinally of said surfaces, one of said surfaces being positioned to intercept said electron stream.

3. An electron discharge device comprising, means for producing a modulated electron stream, a hollow resistor for producing a graduated electrostatic field and mounted to receive the electron stream on an inner wall thereof, said inner wall being adapted to liberate electrons by secondary emission, and an electrode extending longitudinally within said resistor.

4. An electron discharge device comprising a pair of opposed surfaces adapted to liberate electrons by secondary emission, a resistor for producing a potential gradient along said surfaces, an electrode extending longitudinally intermediate said surfaces, and means for directing a modulated electron stream against one of said surfaces.

5. An electron discharge device comprising a pair of opposed surfaces adapted to liberate electrons by secondary emission, a resistor for producing a potential gradient along said surfaces, an electrode extending longitudinally intermediate said surfaces, and means for directing a modulated electron stream against the low potential end of one of said surfaces.

6. An electron discharge device comprising, means for producing a modulated electron stream, a high resistance hollow coil, a filamentary electrode extending axially of said coil, and a surface within said coil adapted to liberate electrons by secondary emission and adapted to intercept said electron stream.

7. An electron discharge device comprising, means for producing a modulated electron stream, a hollow resistor for producing a graduated electrostatic field and mounted to receive the electron stream on an inner wall thereof, said inner wall being adapted to liberate electrons by secondary emission, an electrode extending longitudinally within said resistor, and a shield connected to said electrode substantially closing one end of said resistor.

8. An electron discharge device comprising, a hollow resistor for producing a graduated electrostatic field and having an inner wall adapted to liberate electrons by secondary emission, an electrode extending longitudinally within said resistor, and means for directing a modulated electron stream against said wall at the low potential end of said field.

9. An electron discharge device comprising, a hollow resistor for producing a graduated electrostatic field and having an inner wall adapted to liberate electrons by secondary emission, an electrode extending longitudinally within said resistor, and means for directing a modulated electron stream into said resistor at an oblique angle against said inner wall.

10. An electron discharge device comprising, a hollow resistor for producing a graduated electrostatic field and having an inner wall adapted to liberate electrons by secondary emission, an electrode extending longitudinally within said resistor, and means for directing a modulated electron stream into said resistor at an oblique angle against said inner wall at the low potential end of said field.

11. An electron multiplier comprising an envelope containing a plurality of surface elements adapted to liberate electrons by secondary emission, said elements being mounted to be progressively and serially impacted by an electron stream when energized to successively increasing potentials, electrode means for establishing an accelerating field for acting upon electrons passing from one surface element to another, means for producing a modulated electron stream entering the low potential end of said multiplier, and means for collecting electrons at the high potential end of said multiplier.

12. An electron multiplier comprising an envelope containing a plurality of surface elements adapted to liberate electrons by secondary emission, said elements being mounted to be progressively and serially impacted by an electron stream, means operating when energized to establish successively increasing potentials on said elements, electrode means for establishing an accelerating field for acting upon electrons passing from one surface element to another, said first named means producing a magnetic field directed to reduce the probability of electrons striking said electrode means during their traversal of said series, means for producing a modulated electron stream entering the low potential end of said elements, and means for collecting electrons at the high potential end of said elements.

13. An electron multiplier comprising a plurality of surface elements adapted to liberate electrons by secondary emission, said elements being mounted to be progressively and serially impacted by an electron stream, means adapted to be energized for establishing successively increasing potentials on said elements, a single electrode positioned across the path of the electrons for establishing an additional accelerating field for directing electrons emitted from one surface element toward the surface element next higher in potential and a source of primary electrons positioned for cooperation with the surface element of lowest potential.

14. An electron multiplier comprising a plurality of surface elements adapted to liberate electrons by secondary emission, said elements being serially mounted to be progressively and serially impacted by an electron stream, means substantially co-extensive with said elements and adjacent thereto adapted to be energized for establishing successively increasing potentials on said elements, accelerating electrode means positioned in the general path of the electrons for establishing an additional accelerating field for acting upon electrons passing from one surface element to another and a source of primary electrons adjacent the first surface element.

15. An electron multiplier comprising an envelope containing a source of primary electrons, a pair of spaced surfaces, an electrode intermediate said surfaces for establishing a field acting to accelerate electrons away from one surface toward the spaced surface, and series resistive means connected to various points of each of said surfaces for establishing on different portions thereof different and successively increasing potential.

16. An electron multiplier comprising an envelope containing a pair of spaced surfaces capable of producing secondary electrons at a ratio greater than unity upon electron impact therewith, means comprising an accelerating electrode adapted to be energized for creating electrostatically repeated electron traversal of the space bounded by said surfaces, said means being situated within the electron path, means connected to said surfaces adapted to be energized for creating a progression of the electrons along said surfaces and a source of primary electrons.

17. An electron multiplier comprising a pair of spaced surfaces adapted to liberate electrons by secondary emission upon electron impact therewith, an accelerating electrode positioned in the general path of the electrons intermediate said surfaces for accelerating electrons liberated from one surface toward the other of said surfaces, means substantially co-extensive with said spaced surfaces and adjacent thereto adapted to be energized for establishing an additional field for insuring secondary electron-producing impacts with the surface approached by the accelerated electrons, and a source of primary electrons adjacent one of said surfaces.

18. An electron multiplier according to claim 14, in which the electrode means for establishing the additional accelerating field has a minimum thickness consistent with its support.

19. An electron multiplier comprising a plurality of surface elements adapted to liberate electrons by secondary emission, said elements being serially mounted to be progressively and serially impacted by an electron stream, means adjacent each of said elements and adapted to be energized for establishing successively increasing potentials on said elements, accelerating means positioned in the general path of the electrons for establishing an additional electrostatic accelerating field for directing electrons emitted from one surface element toward the next surface element, and a source of primary electrons adjacent the first surface element.

20. An electron multiplier comprising a plurality of surface elements adapted to liberate electrons by secondary emission, said elements being serially mounted to be progressively and serially impacted by an electron stream, means substantially co-extensive with said elements and adjacent thereto adapted to be energized for establishing successively increasing potentials on said elements, an accelerating electrode adapted to be energized positioned in the electron path intermediate alternate impacted surfaces for accelerating and directing electrons emitted from one surface element toward the next surface element and a source of primary electrons adjacent the first surface element.

21. An electron multiplier comprising an envelope containing a plurality of surfaces capable of emitting secondary electrons at a ratio greater than unity upon electron impact therewith, accelerating means adapted to be energized for producing an electrostatic field directed to remove electrons emitted from one surface to a point adjacent another of said surfaces, said means being positioned across the path of the electrons, means substantially co-extensive with said surfaces and adjacent thereto adapted to be energized for producing an additional field directed to accelerate the adjacent electrons to make a secondary electron-producing impact with said latter surface and a source of primary electrons adjacent one of said surfaces.

22. An electron multiplier comprising an envelope containing a pair of spaced surfaces adapted to liberate electrons by secondary emission, means connected to said surfaces and adapted to energize one of said surfaces to a higher steady potential than the other, an accelerating electrode positioned in the path of the electrons and adapted to be energized to a still higher steady potential, means adapted to be energized for directing primary electrons against said first surface at a velocity capable of producing secondary electrons at a ratio greater than unity, and collector means for utilizing electrons emitted by secondary emission from said second surface.

23. An electron multiplier comprising an envelope containing a pair of opposed surfaces, means connected to said surfaces and adapted for energizing one of said surfaces to a higher steady potential than the other, an accelerating electrode positioned in the path of the electrons and adapted to be energized to a still higher steady potential, means adapted to be energized for directing primary electrons against said first surface at a velocity capable of producing secondary electrons at a ratio greater than unity, and a third surface positioned in said path to intercept electrons emitted by secondary emission from said second surface.

24. An electron multiplier comprising an envelope containing means for producing electrons, a series of surface elements capable of producing electrons at a ratio greater than unity upon electron impact therewith, means adjacent to and surrounding said surfaces adapted for energizing the latter to progressively increasing potentials, and means positioned in the electron paths adapted upon energization to accelerate electrons during their passage from one element to the next.

25. An electron multiplier comprising a series of longitudinally staggered surface elements capable of producing secondary electrons at a ratio greater than unity upon electron impact therewith, double terminal means substantially co-extensive with said surface elements and adapted to be energized for establishing progressively increasing potentials on said surface elements and, when energized, providing a zigzag electron path progressing along a predetermined line and also generating a magnetic field having lines of force parallel to said line of progression, said field including the paths of said electrons, accelerating means adapted to be energized positioned between all alternate surfaces, and a source of primary electrons adjacent the first surface element of the series.

26. An electron multiplier comprising an envelope containing a pair of opposed surfaces capable of producing secondary electrons at a ratio greater than unity upon electron impact therewith, accelerating electrode means intermediate said surfaces and within the electron path for accelerating electrons from one surface toward the other, double terminal means surrounding said path adapted to be energized for producing a potential gradient along said surfaces and a source of primary electrons at one end of said enevelope.

PHILO T. FARNSWORTH.